United States Patent Office 3,442,335
Patented May 6, 1969

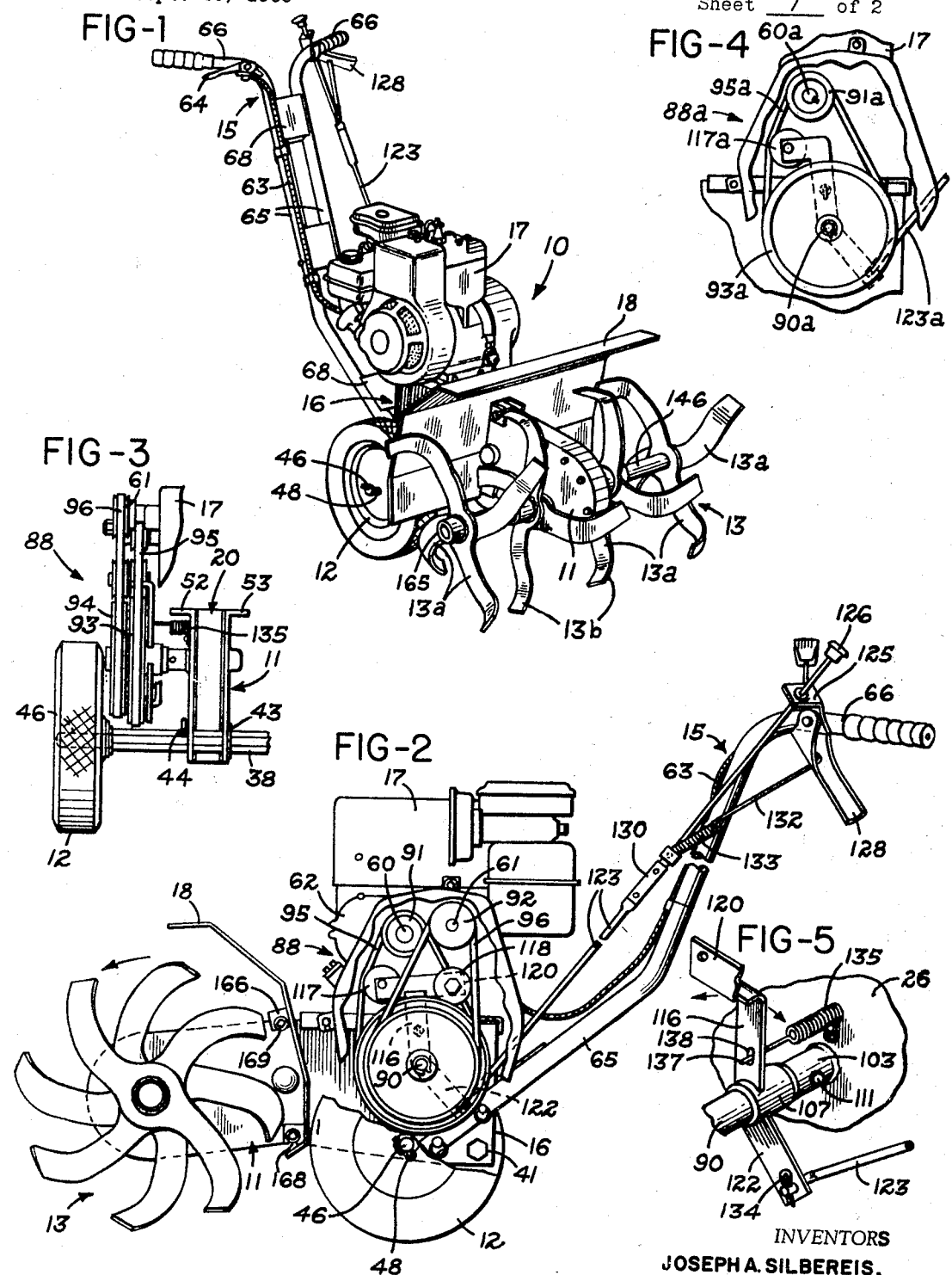

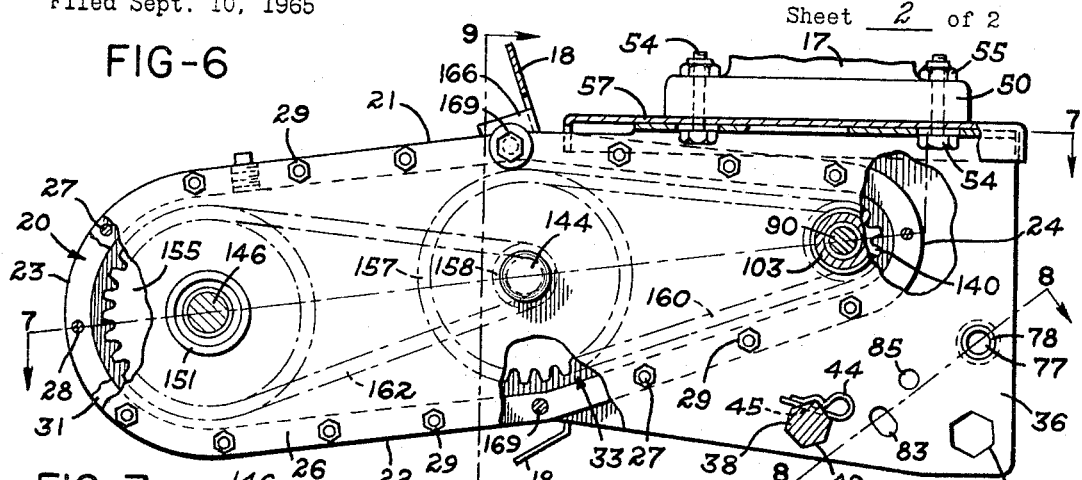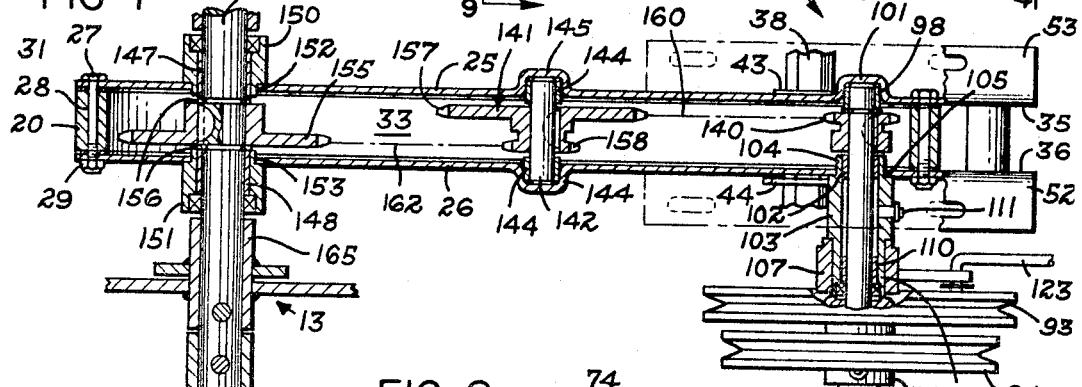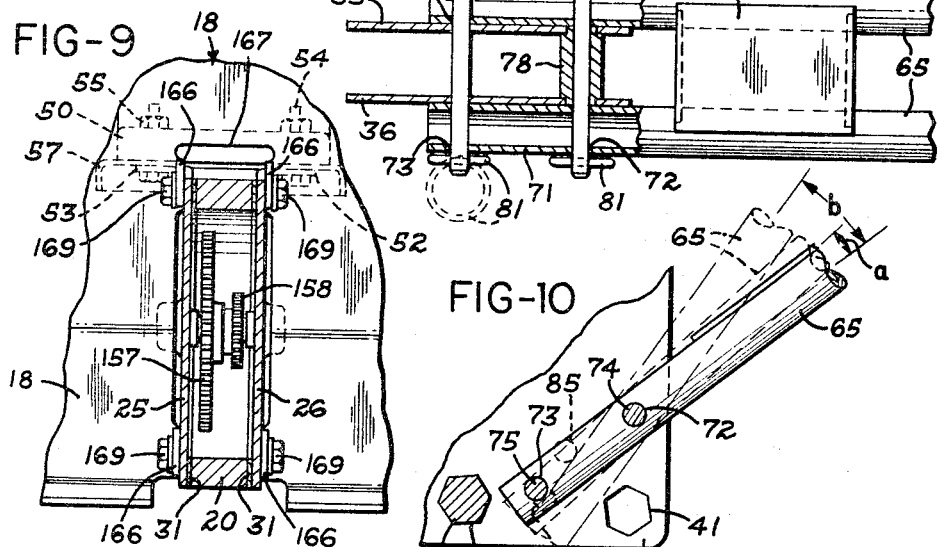

3,442,335
SOIL TILLING DEVICE
Joseph A. Silbereis and Richard D. Holloway, Dayton, Ohio, and Kenneth B. Sadler, Lake Oswego, Oreg., assignors to The Huffman Manufacturing Company, Miamisburg, Ohio, a corporation of Ohio
Filed Sept. 10, 1965, Ser. No. 486,493
Int. Cl. A01b 33/06, 33/08
U.S. Cl. 172—43
3 Claims

ABSTRACT OF THE DISCLOSURE

A two wheeled soil tilling device including an elongated horizontal housing on which all of the components of the tilling device are mounted. The device has a removable handle mounted on the rear portion of the housing, a drive motor mounted on top of the housing, an axle and support wheels in the rear of the housing, and the driven axle on which the tines are mounted is supported on the front end of the housing. A rectangular guard is mounted on the housing directly behind the tines for protecting the user from stones and the like which might be propelled by the tines. The device also includes a transmission unit which allows it to be easily reversed from forward to rearward rotation of the tines allowing it to cultivate close to treees and the like.

---

This invention relates to a device for tilling soil and/or preparing a seed bed and particularly to a power operated tilling device of the type used in gardens, flower beds and the like.

An important object of this invention is to provide an improved tiller which can be easily and quickly manufactured for maintenance free operation and relatively low initial purchase cost.

Another object of this invention is to provide a tiller of the aforesaid type wherein all of the components thereof are mounted directly on an elongated drive housing for simplicity of design and assembly, and further to provide a tiller which is balanced so that the cultivating tines propel the device in a forward direction without the use of a conventional drag stake which substantially decreases the maneuverability and over-all handling characteristics of tillers of this type.

Another object of this invention is to provide a tiller of the aforesaid type with a free floating handle which substantially reduces the transfer of the vibrations and shock produced by the tines, motor and housing to the operator thus providing a tiller which is easier to control and does not materially tire the operator even after a long period of use, and further to provide a tiller wherein the center of gravity can be adjusted in accordance with the depth of cut and the soil condition.

A further object of this invention is to provide a tiller which can be easily assembled and disassembled to enable transportation in the trunk of a car or shipment to the purchasers, and particularly to provide a unit wherein the tines and the handle can be easily and quickly removed for ease in transporting the unit.

Other objects and advantages of the invention will be apparent from the following description, the accompanying drawing and the appended claims.

In the drawings—

FIG. 1 is a perspective view of the tiller in accordance with the invention.

FIG. 2 is a side elevation view of the tiller with a portion of the housing broken away to illustrate the clutch assembly;

FIG. 3 is a rear view of a portion of a tiller illustrating the clutch assembly;

FIG. 4 is a view similar to FIG. 2 showing another embodiment of the clutch assembly;

FIG. 5 is a perspective view of the clutch operating mechanism;

FIG. 6 is an elevation view partially broken away of the drive housing on which all of the components of the tiller are mounted;

FIG. 7 is a sectional view taken along the line 7—7 of FIG. 6;

FIG. 8 is another sectional view taken along the line 8—8 of FIG. 6 with the handle attached to the drive housing;

FIG. 9 is a sectional view along the line 9—9 of FIG. 6; and

FIG. 10 is a side view illustrating the manner in which the handle is secured to the drive housing.

Referring to the drawings wherein preferred embodiments of the invention are illustrated, FIG. 1 shows the tiller assembly 10 including an elongated horizontal housing 11 which is supported above the ground at the rear of the wheel 12 and in the front by the cultivating tines 13. The handle 15 is secured to the rear portion 16 of the housing 11 whereas the motor 17 is mounted on this housing above and slightly behind the wheels 12 for driving the tines 13. A guard 18 is secured to the housing immediately behind the tines 13 for preventing dirt and stones from being thrown in the direction of the motor 17 and the operator, as well as to aid in the breaking up of clods of soil.

The housing 11 is shown in detail in FIGS. 6–9 and includes an elongated central member 20 which defines the top 21, bottom 22, and front and rear ends 23 and 24 of the housing. Secured on opposite sides of the central member 20 are the right and left-hand side plates 25 and 26 which are fastened thereto by the bolts 27 which extend through the openings 28 in the plates and the member 20 and have the nuts 29 secured thereon so that the side plates are held securely in position. The gaskets 31 are interposed between the side plates 25 and 26 and the central member 20 so that the interior 33 of the housing 11 is fluid tight and thus capable of holding a bath of oil for lubricating the drive mechanism.

The downwardly and rearwardly extending portions 35 and 36 (FIG. 8) of the side plates project beyond the central member 20 at the rear of the housing 11. The entire side plates 25 and 26 are constructed of relatively heavy metal and thus the portions 35 and 36 are capable of supporting the handle 15, as well as the axle 38 for the wheels 12. The axle 38 has a hexagonal cross-section and may extend through either pair of the hexagonal openings 41 or 42 provided in the portions 35 and 36. When in either pair of these openings, the axle is held against axial movement by a snap ring 43 on one side and a hairpin clip 44 which extends through a suitable opening 45 in the other side of the axle 38, as shown in FIGS. 3 and 6, to prevent axial movement of this axle.

The outer end of the axle is reduced to a circular cross-sectional portion 46 on which the wheels 12 are mounted and held in position by the hairpin clip 48 (FIG. 2) for easy removal of the wheels. By removing the two hairpin clips 44 and 48, the axle 38 can be withdrawn from either pair of the hexagonal openings 41 and 42 and inserted in the other pair of openings, or it can completely be removed from the housing 11 for reducing the size of the unit for transportation, for example, in the trunk of an automobile. To reattach the wheels 12 to the housing 11, it is merely necessary for the axle 38 to be reinserted through the desired pair of openings 41 or 42, until the snap ring 43 abuts the housing 11 at which time the wheels 12 and clips 44 and 48 are replaced.

The use of two pairs of openings 41 and 42 in the portions 35 and 36 allows the moment arm about which the center of gravity of the tiller 10 acts to be adjusted according to the soil conditions and type of cut to be made. For example, when a deep cut is to be made in relatively hard soil, the axle 38 and wheels 12 are moved to the rearward position 41 so that less weight is carried by the wheels and more of the weight of the motor 17 and the housing 11 tends to force the tines 13 deeper into the ground, and when a shallow cut is to be made in soft soil, the wheels 12 and axle 38 are moved to the forward position 42 so that more weight is carried by the wheels and the weight of the motor is less imposing thereby enabling the operator to easily control the depth of cut.

The motor 17 is a conventional four cycle internal combustion engine which has a base plate 50 (FIG. 6) which is secured to the horizontal flange portions 52 and 53 of the side plates 25 and 26 by the bolts 54 which extend through the flange portions 52 and 53 and the base plate 50, and these components are locked in position by the nuts 55. A sheet metal cover 57 may be provided between the flange portions 52 and 53 and the base plate 50 (FIGS. 6 and 9) for decorative purposes. The motor 17 has the forward and reverse output shafts 60 and 61 projecting from the side 62 thereof as shown in FIG. 2, and the forward shaft 60 rotates about twice the speed of the reverse shaft 61 and in a different direction. The throttle control for the motor 17 is operated by the Bowden-wire 63 which has an actuating lever 64 mounted on the handle 15.

The handle 15 consists of a pair of parallel tubes 65 with the outwardly extending handle portions 66 at the upper ends thereof. The tubes 65 are secured together by the intermediate members 68, and the spacing between these tubes is slightly greater than the distance between the side plates 25 and 26 of the housing 11 so that the lower ends 70 and 71 of the tubes 65 engage the outside surfaces of the portions 35 and 36, as shown in FIG. 8. The lower ends 70 and 71 of the tubes have a pair of spaced and shaped openings 72 and 73 therethrough for receiving the mounting pins 74 and 75, as shown in FIG. 8. The pin 74 extends through the openings 72, the holes 77 in the housing portions 35 and 36 and the reinforcing sleeve 78 interposed therebetween. A ball detent 80 is provided on one end of the pin 74 and a ring 81 is provided on the other for holding the pin in place while providing for easy removal thereof.

Another similar pin 75 extends through the openings 73 in the lower ends 70 and 71 of the tubes 65 and through the elongated slots 83 in the housing portions 35 and 36 to provide for pivotal or free-floating movement of the handle to the angle a, as shown in FIG. 10. As a result of this floating action, the handle 15 floats within limits to prohibit or greatly reduce transfer of vibrations and shocks from the housing 11 to the handle 15. In other words, the housing 11 floats independently of the handle 15 so that when a rock is struck by one of the tines 13, the sudden shock is not transferred through the handle to the operator. However, by forcing the handle 15 upwardly, the operator can still apply additional pressure to the tines 13 causing them to penetrate further into the earth, and by forcing the handle in a downward direction the bite of the tines can be decreased to provide the proper forward movement and soil conditioning.

Also, the handle can be moved to a transporting position by withdrawing the lower pin 75 and moving the handle 15 through the angle b to the position shown in FIG. 10, and then reinserting the pin 75 through the openings 85. In this position, the handle 15 is in a more upright position and allows the operator to easily tilt the housing 11 rearwardly about the axle 38 to raise the tines 13 for rolling the tiller 10 across the ground to and from the work area. In addition, the handle 15 can be easily detached and reattached by withdrawing both pins 74 and 75 by grasping the circular wire rings 81 on the ends thereof and pulling axially thereon so that the ball detents 80 are forced into the pin 74 or 75 to allow the pins to be withdrawn.

The clutch assembly 88 interconnects the forward and reverse output shafts 60 and 61 of the motor 17 to the input shaft 90 of the drive mechanism which rotates the cultivating tines 13. The assembly 88 includes the small pulleys 91 and 92 on the shafts 60 and 61 which are adapted to be selectively connected to the drive shaft 90 which has the forward and reverse pulleys 93 and 94 thereon by the belts 95 and 96. The input shaft 90 is supported at one end for rotation in the housing 11 by a bearing member 98 (FIG. 7) which is press fitted into the indentation 101 formed in the right-hand side plate 25 thereof, and at the other plate 26 by the bearing 102 which is mounted in the sleeve 103 secured to the plate 26 by press fitting the reduced diameter portion 104 into an opening 105 formed in this plate. The sleeve 103 extends outwardly from the side plate 26 and has a collar 107 rotatably mounted adjacent the outer end of the sleeve. Another bearing 110 is provided between the portion 108 and the shaft, and a grease fitting 111 is provided in the sleeve 103 for lubricating purposes. The integral pulleys 93 and 94 are releasably connected to the shaft by key and lock ring on the hub 114.

The T-shaped actuator 116 is secured in the collar 107 and extends upwardly having the pulleys 117 and 118 at the opposite end of the upper arm 120 for alternately engaging the forward and reverse belts 95 and 96, as will be described. The collar 107 is rotated manually through a linkage which includes the downwardly extending arm 122 rigidly secured to the collar 107 and the rigid link 123 extending from this arm upwardly through the bracket 125 on the handle portion 66. Thus, by pushing downwardly on the knob 126, the link 123 is moved downwardly to rotate the arm 122 in a clockwise direction. To move the arm 122 in a counterclockwise direction, the hand lever 128 is pivotally mounted on the bracket 125 and is connected to an intermediate portion 130 of the link 123 by the rod 132 and the spring 133. The spring 131 allows adjustment of the handle 15 without any adjustments in the operating linkage. The manually removable hairpin clip 134 connects the link 123 to the arms 122 so that these components may be easily separated to permit removal of the handle 15 from the housing 11.

In operation of the clutch assembly 88, when it is desired to drive the tines 13 in a forward direction, the hand lever 128 is depressed toward the handle portion 66 causing the links 132 and 123 to be moved upwardly thereby pivoting the actuator 116 in a counterclockwise direction causing the drive pulley 117 to engage the forward drive belt 95 to apply sufficient tension thereto to transfer rotation of the forward shaft 60 to the input shaft 90 of the drive mechanism. When this hand lever is released, the actuator mechanism automatically returns to a neutral position wherein no power is transferred to the drive shaft 90, and this is effected by the coil spring 135 (FIG. 5) which is secured to the side plate 26 of the unit 11 and has the finger 137 extending through the opening 138 in the actuator 116. The bias of this spring 135 holds the finger 137 in a central or neutral position so that it always urges the actuator to a neutral position.

When it is desired to operate the tines 13 in a reverse direction, the knob 126 is depressed to force the link 123 downwardly causing the actuator 116 to be rotated in a clockwise direction so that the reverse drive pulley 92 engages and tensions the belt 96 to transfer rotary movement of the reverse drive shaft 61 to the input shaft 90 of the drive mechanism. Usually the reverse operation is performed only a short time in order to withdraw the tines 13 from the soil or to back away from a tree or other obstacle so that depressing the knob 126 is not difficult for this short time.

Rotation of the input shaft 90 is transferred to the tines 13 by the drive mechanism which includes a chain drive sprocket 140 secured on the input shaft 90 within the interior 33 of the housing 11, as shown best in FIGS. 6 and 7. An intermediate chain sprocket 141 is secured on the idler shaft 142 which is journaled in the bearings 144 which have been pressed fitted into the depressions 145 in the side plates 25 and 26. The tine drive shaft 146 is journaled near the forward end of the housing 11 by the bearings 147 and 148 which are secured in the collars 150 and 151 press fitted in the openings 152 and 153 in each of the plates 25 and 26.

Between the collars 150 and 151 on the shaft 146 is a drive sprocket 155 which is keyed to the shaft and secured axially with two lock rings 156. The idler shaft 142 has a dual sprocket member mounted thereon and including the large sprocket 157 and the smaller sprocket 158. The chain 160 drivingly interconnects the small and large diameter sprockets 140 and 157, respectively, whereas a similar chain 162 interconnects the small and large diameter sprockets, respectively. It should be apparent that the driving sprockets 140 and 158 are in each case smaller than the driven sprockets 155 and 157 so that there is a substantial decrease in speed with an increase in torque.

The tines 13 are releasably secured to the drive shaft 146 which extends from the opposite sides of the housing 11. Each of the tines has a hub portion 165 thereon which rigidly and releasably secures the tines 13 to the drive shaft 146, and each of the tines 13 includes a plurality of arms 13a which extend radially outward and have the deformed shoe portions 13b on the end thereof for breaking up and cultivating the soil. Suffice to say, the particular design of the tines 13 is not part of the present invention, it being only necessary that some type of soil cultivating means be mounted on the shaft 146 on opposite sides of the housing 11.

The guard 18 is mounted on the housing 11 immediately behind and coextensive with the drive shaft 146 so that it forms a shield behind all of the tines 13. As shown in FIG. 2, the guard 18 also extends from adjacent the bottom 22 of the housing 11 to a point substantially directly above the tines 13 for preventing soil or other objects from being thrown onto the motor 17 or the operator standing behind the handle 15. The guard 18 is releasably secured in position by the ears 166 which are provided on the guard on opposite sides of the U-shaped slot 167 which has a width slightly larger than the width of the housing 11. These ears have downwardly extending open ended slot 168 therein through which the bolts 169 pass to clamp the ears 166, and thus the guard 18, to the housing 11. By merely loosening the bolts, the guard 18 can be removed from the housing by withdrawing it upwardly and away from the tiller 10.

Another form of the clutch assembly 88a is shown in FIG. 4, and includes apparatus for driving the tines 13 in a forward direction only. Accordingly, the reverse drive mechanism has been removed so that, when the link 123a is moved upwardly in response to the movement of the hand member 128, the drive pulley 117a is forced against the drive belt 95a to effect transfer of rotation between the drive shaft 60a of the motor 17 and the input shaft 90a of the drive mechanism through the pulleys 91a and 93a. The tiller in all respects operates substantially identical to that described above, with the exception that there is no reverse. It is also possible within the scope of this invention to use a centrifugal type clutch in place of the clutch assembly 88a. In such a centrifugal clutch arrangement, the clutch remains disengaged while the motor is idling or operating at a slow speed, and is engaged when the throttle is advanced to speed the motor up.

The motor 17 is mounted on the housing 11 above the axle 38 and the weight of the various components of the tiller 10 are carefully correlated so that the device is substantially balanced when the axle 38 is in either of its alternate positions. This allows the operator to easily maneuver and control the direction of the tiller and the depth of cut and, as a result, the tiller does not require a drag stake as do many of the piror art devices.

The invention has thus provided an improved tiller assembly which utilizes a unique housing 11 on which all of the components of the tiller are directly moutned to greatly reduce the weight and cost of the unit, as well as providing for design simplicity thereof. The center of gravity can be moved between alternate positions as desired or as dictated by the soil conditions and the type of cut to be made, and the handle is free floating within limits so that the least shock and vibrations encountered by the housing are not transferred to the operator thus making it less fatiguing to operate the tiller. Moreover, the handle can be moved to a forward position for use in tilting the tines upwardly above the ground for transportation to and from the work area, and the handle, the wheels, the tines, and guard can be easily and quickly removed and replaced for transportation of the unit.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A two wheeled soil tilling device adapted to cultivate the soil comprising, an elongated horizontal housing on which all other components of the tilling device are directly mounted, said housing including an elongated horizontal disposed oval-shaped central member having side plates secured on opposite sides thereof for defining a closed chamber, said side plates extending rearwardly of and below said central member to define parallel mounting portions, two pairs of aligned openings in said mounting portions, a first axle extending through either pair of said aligned pairs of openings in said mounting portions of said housing, manually releasable means for securing said first axle to said mounting portions locked against angular movement while permitting it to be placed in either of said pairs of openings, a wheel releasably mounted on each end of said first axle, an engine mounted on said housing above said axle so that it cooperates with the weight of the other components of the device to create a tilling device which is substantially balanced for ease of control and maneuverability, a free floating handle secured to said mounting portions and extending rearwardly and upwardly for convenient use by the operator in guiding the device, pin means for manually releasably securing said handle to said mounting portions to provide for easy removal of said handle by transportation and the like, a second axle extending through the front end of said housing and said closed chamber parallel to said first axle, tine means releasably secured to said second axle on opposite sides of said housing for cultivating the soil, a rectangular guard having a slot therein to be received on said housing adjacent the rear of said tines, said guard being coextensive with said second axle for preventing dirt and other objects from being thrown toward said engine and the operator, drive means in said closed chamber for transferring power from said engine to said second axle for rotating said tines, and a forward-reverse transmission unit interposed between said engine and said oval-shaped member of said housing.

2. A soil tilling device as defined in claim 1 wherein said drive means in said closed chamber for transferring power from said engine to said second axle for rotating said tines includes a plurality of chain sprockets supported in said chamber by shafts mounted on said side plates, drive chains interconnecting said sprockets, and one of said sprockets being mounted on and secured to said second axle.

3. A soil tilling device as defined in claim 2 wherein said pin means includes two elongated parallel pins extending through said handle and parallel mounting portion of said side plates, said pins having detent means thereof for releasably holding said pins against axial movement and to provide for easy removal of said handle without the use of tools.

References Cited

UNITED STATES PATENTS

| | | | |
|---|---|---|---|
| 2,835,182 | 5/1958 | Smithburn | 172—43 |
| 2,864,293 | 12/1958 | Edrich et. al. | 172—42 |
| 2,893,497 | 7/1959 | Vellenzer | 172—42 |
| 2,903,077 | 9/1959 | Kamlukin | 172—42 |
| 2,943,687 | 7/1960 | Merry et al. | 172—125 |

FOREIGN PATENTS

| | | |
|---|---|---|
| 665,864 | 7/1963 | Canada. |
| 298,119 | 10/1928 | Great Britain. |
| 804,648 | 8/1936 | France. |

ABRAHAM G. STONE, Primary Examiner.

J. R. OAKS, Assistant Examiner.

U.S. Cl. X.R.

172—125